(12) United States Patent
Cazzaniga et al.

(10) Patent No.: US 9,575,089 B1
(45) Date of Patent: Feb. 21, 2017

(54) ADAPTIVE PHASE DELAY ADJUSTMENT FOR MEMS SENSORS

(71) Applicant: Maxim Integrated Products, Inc., San Jose, CA (US)

(72) Inventors: Gabriele Cazzaniga, Rosate (IT); Luciano Prandi, Bellinzago Novarese (IT); Carlo Caminada, Pregnana Milanese (IT); Federico Forte, Novara (IT)

(73) Assignee: Maxim Integrated Products, Inc., San Jose, CA (US)

( * ) Notice: Subject to any disclaimer, the term of this patent is extended or adjusted under 35 U.S.C. 154(b) by 370 days.

(21) Appl. No.: 14/137,744

(22) Filed: Dec. 20, 2013

Related U.S. Application Data

(60) Provisional application No. 61/750,138, filed on Jan. 8, 2013.

(51) Int. Cl.
*G01P 21/00* (2006.01)

(52) U.S. Cl.
CPC ..................... *G01P 21/00* (2013.01)

(58) Field of Classification Search
None
See application file for complete search history.

(56) References Cited

U.S. PATENT DOCUMENTS 5,138,883 A * 8/1992 Paquet .................. G01C 19/30 73/504.18
2007/0194842 A1* 8/2007 Hotelling ........... G01C 19/5705 329/307

* cited by examiner

*Primary Examiner* — Paul West
*Assistant Examiner* — Mark A Shabman
(74) *Attorney, Agent, or Firm* — North Weber & Baugh LLP (57) ABSTRACT

Various embodiments of the invention allow to cancel demodulation phase error. In certain embodiments, cancellation is accomplished by determining the phase delay of a drive front end signal that is in phase with an undesired signal and digitally adjusting the demodulation signal with a calibrated signal. The phase delay may be adaptively compensated during regular circuit operation, only at predetermined times, or during a factory calibration.

18 Claims, 5 Drawing Sheets

ADAPTIVE PHASE DELAY ADJUSTMENT FOR MEMS SENSORS

CROSS REFERENCE TO RELATED PATENT APPLICATIONS

The present application claims priority to U.S. Provisional Application Ser. No. 61/750,138, titled "Adaptative Phase Delay Adjustment for MEMS Sensors," filed on Jan. 8, 2013 by Gabriele Cazzaniga, Luciano Prandi, Carlo Caminada, and Federico Forte, which application is incorporated herein by reference in its entirety.

BACKGROUND

A. Technical Field

The present invention relates to signal processing of electronic sensors, and more particularly, to systems, devices, and methods of reducing errors in angular rate sensor circuits.

B. Background of the Invention

In some circuit applications, such as in MEMS sensor circuits, the phase difference between a desired signal, such as a sinusoidal waveform of a Coriolis signal generated by a gyroscope and a demodulation phase signal, such as a quantized sinusoidal waveform, must be kept as small as possible to reduce undesired effects, such as offset dependency on the acceleration signals. Some existing approaches estimate a demodulation phase or determine a value based on analytical modeling. The value estimated or calculated at the design level remains associated with the demodulation phase during regular circuit operation. Traditional approaches do not measure and calibrate the demodulation phase and, thereby, fail to take advantage of potential improvements in the rejection of external disturbances, such as acceleration errors.

SUMMARY OF THE INVENTION

Various embodiments of the invention increase the overall accuracy of electronic sensors by reducing the effects of undesired signals, such as spurious quadrature error signals in gyroscopes, by adjusting the phase delay between a front end circuit and a demodulation signal.

In certain embodiments, the phase delay introduced by a sense front end circuit is determined and calibrated by using a signal path between the output of a drive front end circuit and the input of a sense front end circuit. Calibration is accomplished, for example, by determining the phase delay of the drive front end signal that is in phase with the undesired signal, for example a quadrature error signal, and adjusting the demodulation signal to be 90° out of phase with respect to the drive front end signal. In one embodiment, the demodulation signal is adjusted by a phase trim module that is coupled to a lookup table, which holds a calibrated signal that is in phase and has the same frequency as the drive front end signal.

In some embodiments, the phase delay is adaptively compensated during regular circuit operation by employing a dedicated closed-loop circuit that is coupled to a scaling circuit comprising a digital-to-analog converter (DAC).

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Although some embodiments are described as MEMS sensor implementations, the invention is equally applicable to other types of sensors.

Figure 1:
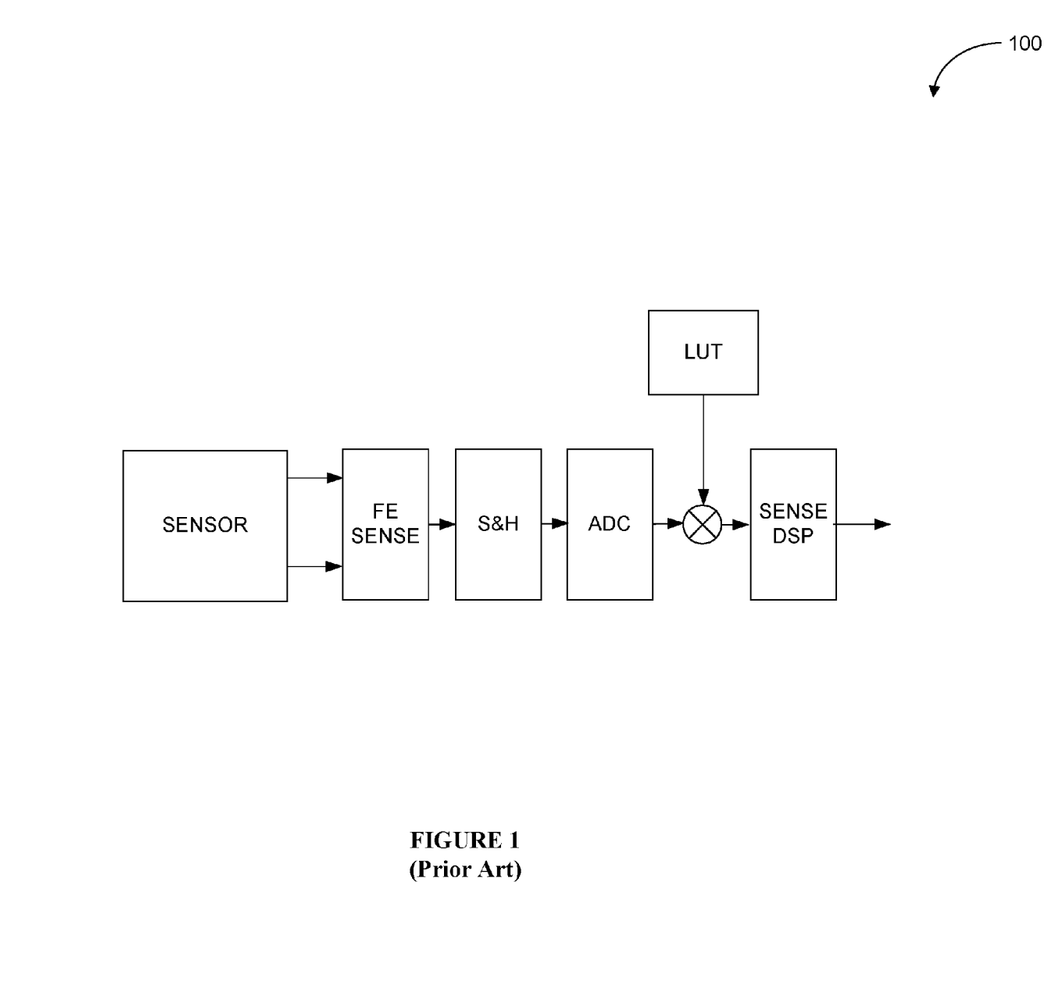
FIG. 1 is a general illustration of a prior art circuit having a pre-determined demodulation phase.

FIG. 1 is a general illustration of a prior art circuit having a demodulation phase that is pre-determined during the design process. The demodulation phase is typically determined based on a calculated value and remains unchanged during circuit operation. However, it would be desirable to have systems and methods that measure and calibrate the demodulation phase in order to improve the ability to reject unwanted signals, such as spurious quadrature error signals.

Figure 2:
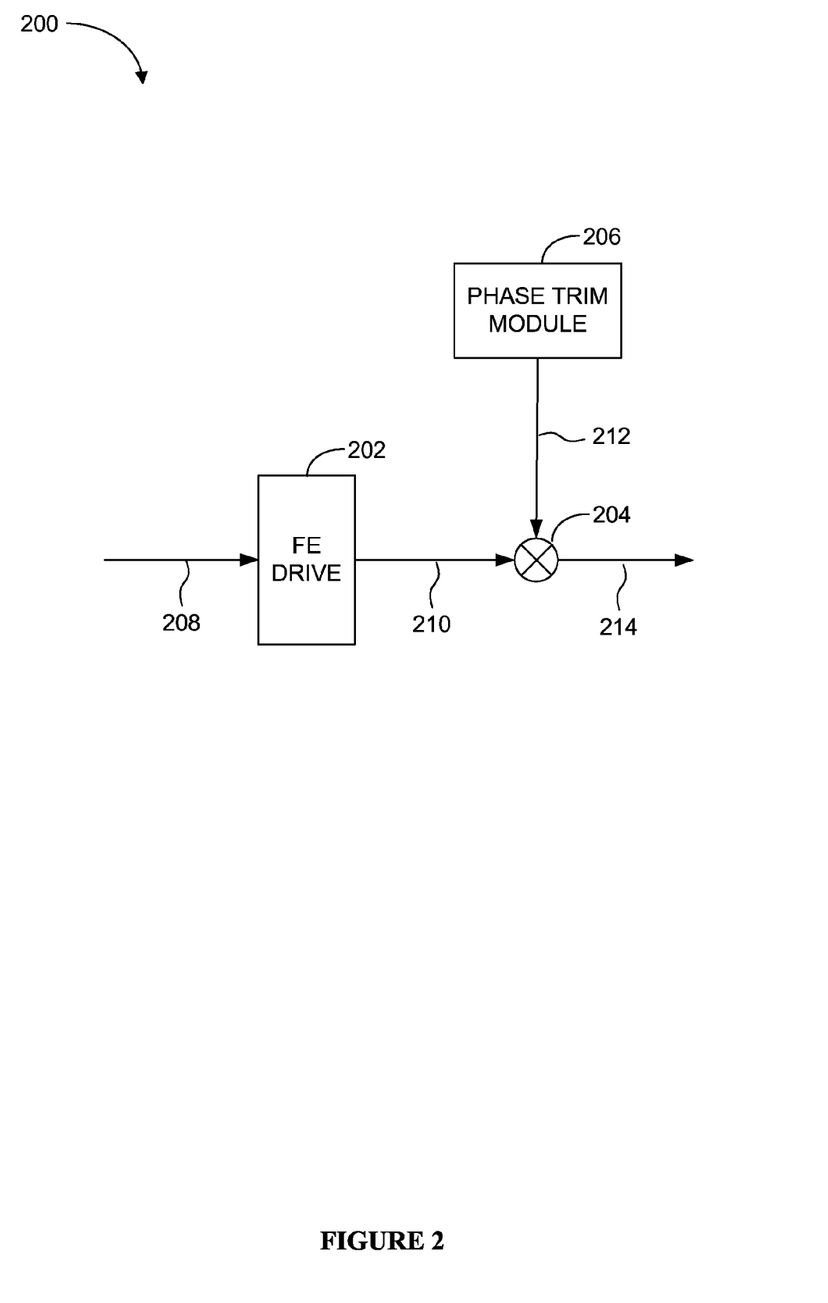
FIG. 2 is an illustrative block diagram of a phase delay compensation circuit, according to various embodiments of the invention.

FIG. 2 is an illustrative block diagram of a phase delay compensation circuit, according to various embodiments of the invention. Phase delay compensation circuit 200 comprises drive front end 202, demodulator 204, and phase trim module 206. Drive front end 202 is a front end circuit that converts sensor signal 208 into a converted signal 210, such as a differential analog or digital voltage signal, which is then provided to demodulator 204.

In one embodiment, sensor signal 208 and, thus, converted signal 210 comprises a quadrature error component. The converted signal 210 has the same frequency as a Coriolis signal, but leads converted signal 210 by phase equal to 90°. Phase trim module comprises calibrated signal 212 that is in phase with and has the same frequency as the Coriolis signal. Demodulator 204 may be a digital demodulator that receives converted signal 210 and demodulates it with calibrated signal 212 in order to adjust the demodulation phase to be in phase with the Coriolis signal, thereby, canceling the demodulation phase error.

Figure 3:
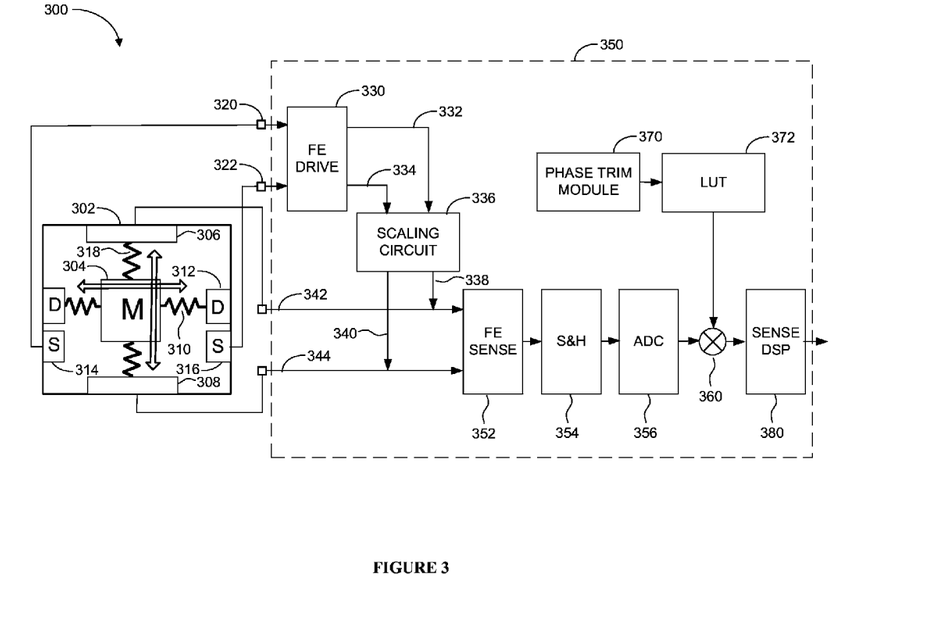
FIG. 3 is an illustrative schematic of a phase delay compensation system, according to various embodiments of the invention.

FIG. 3 is an illustrative schematic of a phase delay compensation system, according to various embodiments of the invention. System 300 comprises sensor 302 and compensation circuit 350. Sensor 302 may be any sensor configured to measure a physical quantity and output a readout signal associated with that physical quantity. In example in FIG. 3, sensor 302 comprises a pair of drive electrodes 312, a pair of sense electrodes 314, 316, a pair of capacitive sense electrodes 306, 308, and proof mass 304. Proof mass 304 is suspended in space by a set of springs 310, 318 forming a spring-mass system that enables oscillations along two orthogonal axes.

In one embodiment, sensor 302 is implemented as a MEMS gyroscope that comprises a polysilicon layer that serves as proof mass 304. The polysilicon layer is anchored to a fixed portion of sensor 302. MEMS gyroscope 302 typically uses electronic circuitry to apply energy to drive electrodes 312 via electrostatic or mechanical forces. When energy is applied at the characteristic mechanical resonant frequency of the spring-mass system, friction forces (e.g., caused by air particles moving around the electrodes) that give rise to unwanted damping effects can be counteracted in order to sustain a perpetual harmonic oscillation of moving proof mass 304.

In operation, an alternating drive current may excite proof mass 304 into a sinusoidal oscillation along a drive direction (e.g., a spatial axis). Capacitive sense electrode 306, 308 measures in a sense direction orthogonal to the drive direction a capacitive change as a function of a rotation of the gyroscope. The rotation acting on sensor 302 is caused by a Coriolis force in response to an angular velocity applied to sensor 302. Capacitive sense electrode 306, 308 converts the capacitive change into an output signal 342, 344 that is proportional to the Coriolis force to be measured.

Compensation circuit 350 comprises drive front end 330 that is coupled to sense front end 352 via scaling circuit 336. Sense front end 352 is coupled to demodulator 360 via optional sample and hold circuit 354 and ADC 356. Compensation circuit 350 further comprises phase trim module 370 that is coupled to lookup table (LUT) 372. Demodulator 360 is configured to receive the outputs of LUT 372 and ADC 356 to generate an output signal that may be further processed in an analog processing module or in digital signal processing device (DSP) 380 before being output from system 300.

Within sensor 302, drive electrode 312 capacitively applies a force on proof mass 304 to cause a linear mechanical oscillation in the horizontal direction that are independent from an external angular rate. The mechanical oscillation occurs at a resonant frequency $f_D$, ideally equal to the electrical drive frequency. The accompanying drive movement is proportional to a charge variation sensed by sense electrode 314, 316. Sense electrode 314, 316 may be implemented as a capacitive electrode that capacitively measures the drive movement in the form of a displacement or velocity variation of resonating proof mass 304. When the capacitance value of one sensor electrode 314 increases and the value of the capacitance of the other sense electrode 316 decreases, sensor 302 detects the capacitive change and outputs differential signal 320, 322, for example a sinusoidal signal, that is proportional to the drive movement.

Capacitive sense electrode 306, 308 generates differential signal 342, 344 that is a measure of the Coriolis force acting on proof mass 304. Differential signal 342, 344 is forwarded to sense front end 352 and further processed to be output as the measured angular rate.

Drive front end 330 is a front end circuit that converts differential signal 320, 322 representative of the drive movement measured by sense electrode 314, 316 into, for example, a differential voltage signal 332, 334. Both drive front end 330 and sense front end 352 may be implemented as switched-capacitor networks comprising a charge amplifier or a transimpedance amplifier.

Scaling circuit 336 receives drive front end signal 334, 332, which may be a voltage that, as previously mentioned is in phase with a quadrature error signal and 90° out of phase with a Coriolis signal. In one embodiment, drive front end signal 334, 332 compromises a quadrature error signal. Scaling circuit 336 determines how much of its input voltage is converted into another quantity, such as a charge, may then be provided to sense front end 352. As a result, sense front end 352 receives from scaling circuit 336 a scaled signal that is in phase with the drive signal, i.e., in phase with the quadrature error signal. Scaling circuit 336 may be implemented digitally or with analog circuit components, for example, as a DAC comprising coupling capacitors.

Quadrature error is a non-ideality that generated a signal at the same or similar frequency as the signal caused by the Coriolis force. However, the phase of the latter lags the phase of the former by exactly 90°. Because the velocity variation of resonating proof mass 304 driven by drive signal 312 is in phase with the quadrature error signal and 90° out-of-phase with the Coriolis force, the quadrature error can be detected by synchronous demodulation, and differential signal 320, 322 can be used as a reference signal to calibrate the phase delay of the demodulation signal of demodulator 360.

In one embodiment, the output of sense front end 352 is a voltage signal is passed to sample and hold circuit 354, which may be implemented with a switched-capacitor circuit that after sampling and holding the voltage for a predetermined period of time outputs the voltage to analog-to-digital converter (ADC) 356. ADC 356 may be a bandpass delta-sigma ($\Delta\Sigma$) ADC that may be configured to convert narrowband signals. However, a lowpass $\Delta\Sigma$ ADC or any suitable type of ADC may be employed. In some embodiments, the sample and hold operation is optional. For example, in a time-division switched-capacitor circuit embodiment that uses a continuous-time $\Delta\Sigma$ ADC. ADC 356 converts the analog signal it receives to the digital domain at the drive resonating frequency $f_D$ of sensor 302.

Demodulator 360 may be a digital demodulator that receives the quantized sensor signal from the output of ADC 356 and demodulates it with data retrieved from LUT 372 used as a reference signal to adjust the demodulation phase to be in phase with the Coriolis signal in order to minimize the demodulation phase error. LUT 372 may receive the reference signal from phase trim module 370, which, in the digital domain, may comprise a digital calibration word representative of the calibrated demodulation phase. In one embodiment, the digital calibration word is a calibrated digital representation of a periodical waveform, such as a sinusoidal waveform having the same frequency as the drive signal 332, 334. The calibration word can be stored in LUT 372. It is understood that phase trim module 370 and LUT 372 may be combined within a single device, and that the calibration word in phase trim module 370 may be changed during a calibration or adaptively during regular circuit operation.

Ideally, the quadrature error component and the calibration word signals input into demodulator 360 are 90° out-of-phase, such that the output signal of demodulator 360 exhibits no offset. If the two input signals are not perfectly 90° out-of-phase, the output signal of demodulator 360 will be a sinusoidal signal having a double frequency component and a constant offset value, e.g., a mean value, that is analytically proportional to the phase error between the two input signals.

Note that input signal 342, 344 may be disconnected from sense front end 352 during a calibration procedure, such that only sensor signals 320, 322 are read by circuit 350. The output signal of sense front end 352 is further processed and demodulated in the digital domain by ADC 356. During calibration, demodulator 360 demodulates the sinusoidal signal received from LUT 372 with the sinusoidal signal received from ADC 356. Since the two sinusoidal signals have the same frequency $f_D$, the multiplication of the two frequencies by demodulator 360, generates a demodulated signal comprising a frequency $2 \cdot f_D$. Sense DSP 380 is a signal processing device that may comprise a filter, e.g., a lowpass filter. One of the functions of DSP 380 is to filter out harmonic frequency components from the demodulated signal at the output of modulator 360.

Calibration may be performed in manufacturing or by an adaptive method. In one embodiment, at the testing level, phase trim module 370 may use external testing equipment to determine the offset value and internally generate and adjust the calibration word accordingly to minimize the demodulation phase error to ideally a zero value. Adjusting the digital calibration word may include common read/write operations, such as increasing or decreasing the digital word value accordingly via a serial interface communication using the external testing equipment to modify one or more registers within phase trim module 370. Any method known in the art to adjust and minimize the offset value may be used in minimizing the demodulation phase error according to the embodiments of the invention.

Note that the differential topology shown in system 300 allows the rejection of unwanted common mode related signals in the analog part of circuit 350 that otherwise would decrease the overall signal-to-noise ratio. One skilled in the art will appreciate that multiplexers, de-multiplexers, choppers, de-choppers, and other additional signal processing components may be used at various locations in the signal path to process sensor signals. Signal processors may be used to convert sensor signals between continuous-time signals to discrete signals and vice versa.

Figure 4:
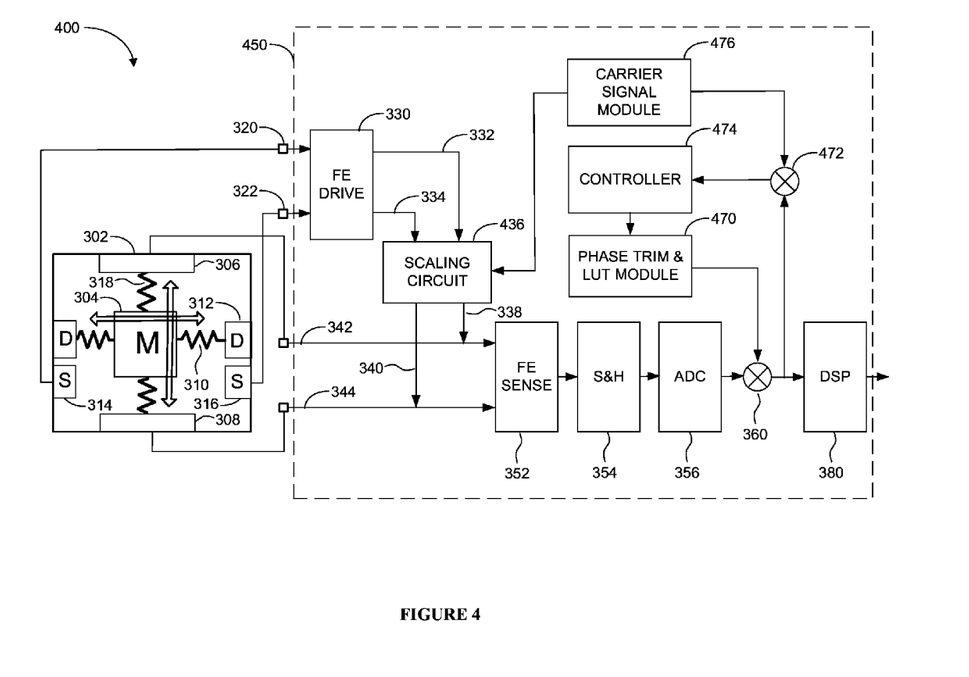
FIG. 4 is an illustrative schematic of adaptive phase delay compensation system using a dedicated closed-loop circuit design, according to various embodiments of the invention.

FIG. 4 is an illustrative schematic of adaptive phase delay compensation system using a dedicated closed-loop circuit design, according to various embodiments of the invention. For clarity and simplicity, components similar to those shown in FIG. 3 are labeled in the same manner and their description and function is not repeated. System 400 comprises demodulator 472, controller 474, and carrier signal module 476 in addition to components shown in FIG. 3.

As shown in FIG. 4, phase trim and LUT module 470 combine the phase trim and LUT of FIG. 3 into a single module. Phase trim and LUT module 470 is coupled to receive a signal from controller 474. Controller 474 is configured to receive an output signal of demodulator 472. Carrier signal module 476 and the output of demodulator 360 are demodulated to generate the output signal of demodulator 472. Carrier signal module 476 is further coupled to scaling circuit 436.

In one embodiment, demodulator 472 demodulates the output of demodulator 360 with the output signal of carrier signal module 476 as a reference signal. In this example, carrier signal module 476 generates a sinusoidal waveform having an out-of-bandwidth frequency of, e.g., 500 Hz. This frequency is relatively low when compared to that of the driving signal, which typically is the range of, e.g., 25 kHz. However, the frequency values herein are not intended as a limitation on the invention. The output of demodulator 472 is then input to controller 474. Controller 474 interfaces with phase trim and LUT module 470 to continuously adjust the demodulation phase error. Controller 474 may be any controller known in the art that can be used to continuously minimize a constant value that is proportional to the demodulation phase error. In this implementation, the constant value is continuously read and the calibration word is adjusted to minimize the demodulation phase error during regular operation of circuit 350. In another embodiment, controller 474 adjusts the demodulation phase error only at predetermined times, such as at power-up or during a factory calibration.

In one embodiment, scaling circuit 436 multiplies the sinusoidal carrier signal with the output signal of drive front end 330 in order to adjust the gain of output signal 332, 334. In other words, the scaling factor is no longer a constant gain, but multiplied by the digital word. The resulting signal 338, 340 has two frequency components at 25 kHz+/−500 Hz, respectively. The two signals are translated into the digital domain, and after demodulation the remaining signal at the output of demodulator 360 will have a frequency of 500 Hz. This carrier signal is filtered out by DSP 380, such that circuit 450 outputs only the desired angular rate information without the carrier signal.

It is understood that analog signals are not limited to sampled time-division signals, but may include continuous-time signals. One skilled in the art will understand that digital paths may be implemented in the analog domain, such that the calibration may be performed with analog devices including an analog demodulator and DSP 380.

Figure 5:
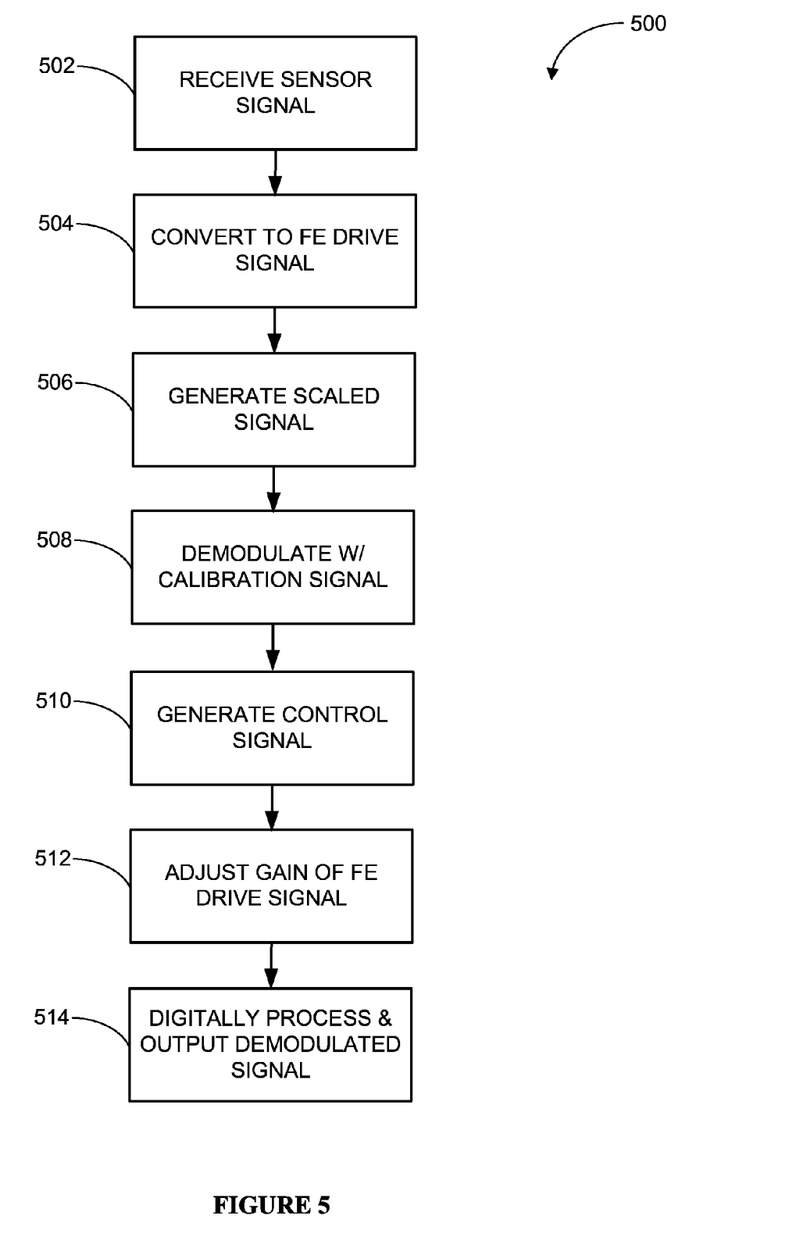
FIG. 5 is a flowchart of an illustrative process for phase delay compensation, in accordance with various embodiments of the invention.

FIG. 5 is a flowchart of an illustrative process for phase delay compensation, in accordance with various embodiments of the invention. The process for phase delay compensation starts at step 502 when a drive front end circuit receives a sensor signal that is a function of a sensor drive movement measured, for example, by a pair of sensor electrodes. The drive movement may be in phase with a quadrature error signal and 90° out of phase with a Coriolis signal.

At step 504, the drive front end circuit converts the sensor signal into, for example, a differential analog voltage proportional to the sensor signal.

At step 506, a scaling circuit scales the drive front end signal to generate a scaled sensor signal.

At step 508, a first demodulator demodulates the scaled signal with a calibration signal to adjust the phase of the scaled sensor signal to be 90° out of phase with respect to the drive front end signal, such as to minimize the phase error.

At step 510, a second demodulator demodulates the first demodulated signal with a carrier signal as a reference to generate a control signal that controls the calibration signal.

At step 512, the gain of the drive front end signal adjusted by multiplying it with the carrier signal.

At step 514, the first demodulated signal is digitally processed, for example, filtered by a digital signal processing module prior to being output as an output signal.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A phase delay adjustment circuit comprising:
   a front end drive circuit to convert a sensing-drive sensor signal into a reference signal, the reference signal is sinusoidal and has a reference phase;
   a scaling circuit coupled to the front end drive circuit to convert the reference signal into a scaled signal, the scaled signal having a first phase;
   a sensing circuit coupled to receive the scaled signal and a sensor signal having a second phase that is out of phase with respect to the first phase, the sensing circuit generates an output signal that comprises a phase error; and
   a phase trim module coupled to the demodulator, the phase trim module provides a calibration signal to the demodulator; and
   a digital demodulator coupled to the sensing circuit, the demodulator uses the calibration signal to compensate for the phase error.

2. The phase delay adjustment circuit according to claim 1, wherein the phase trim module comprises a lookup table, the phase trim module adjusts the phase of the first demodulation sign based on the calibration signal.

3. The phase delay adjustment circuit according to claim 1, wherein the calibration signal is modified during regular circuit operation.

4. The phase delay adjustment circuit according to claim 3, further comprising
   an ADC that converts the scaled signal into a digital domain signal; and
   a sample-and-hold circuit coupled to the ADC, the sample-and-hold circuit samples and holds the scaled signal for a predetermined period of time prior to outputting the scaled signal to the ADC.

5. The phase delay adjustment circuit according to claim 4, wherein the ADC is a delta-sigma ADC.

6. The phase delay adjustment circuit according to claim 1, wherein the calibration signal is a digital word representative of a calibrated demodulation phase, the calibration signal is configured to cancel the scaled signal through a demodulation in quadrature and move the sensor signal into a base band via coherent demodulation.

7. The phase delay adjustment circuit according to claim 6, wherein the phase trim module adjusts the calibration word to reduce the phase error.

8. The phase delay adjustment circuit according to claim 1, further comprising a carrier signal that is used to dynamically track the calibration signal.

9. The phase delay adjustment circuit according to claim 8, further comprising a carrier signal module coupled to the scaling circuit in a feedback configuration, the carrier signal module is configured to adjust the gain of the reference signal and generate the carrier signal.

10. The phase delay adjustment circuit according to claim 9, wherein a second demodulator is coupled to the carrier signal module, the second demodulator demodulates the first demodulated signal with the carrier signal and allows to dynamically adjust the calibration signal based on the phase error.

11. The phase delay adjustment circuit according to claim 10, wherein the carrier signal is superimposed to the sensor signal at an out-of-bandwidth frequency.

12. The phase delay adjustment circuit according to claim 1, wherein the sensor signal is in phase with a quadrature error signal and 90° out of phase with a Coriolis signal.

13. A phase delay adjustment system comprising:
   a front end drive circuit to convert a sensing-drive sensor signal into a reference signal, the reference signal being a sinusoidal signal comprising a reference phase;
   a scaling circuit coupled to the front end drive circuit to convert the reference signal into a scaled signal, the scaled signal having a first phase;
   a sensing circuit coupled to receive the scaled signal and a sensor signal having a second phase that is out of phase with respect to the first phase, the sensing circuit generates an output signal that comprises a phase error;
   a first digital demodulator coupled to the sensing circuit, the first demodulator generates a digital demodulated signal;
   a phase trim module coupled to the demodulator, the phase trim module provides a calibration signal to the first digital demodulator, the calibration signal is configured to compensate the phase error;
   a carrier signal module coupled to the scaling circuit, the carrier signal module is configured to adjust the gain of the reference signal and to generate a carrier signal; and
   a second digital demodulator coupled to the carrier signal module, the second digital demodulator demodulates the digital demodulated signal with the carrier signal.

14. The phase delay adjustment system according to claim 13, wherein the carrier signal module generates a sinusoidal waveform having an out-of-bandwidth frequency that is lower than a frequency of the reference signal.

15. The phase delay adjustment system according to claim 13, wherein the sensor comprises a sense electrode that converts one of a displacement variation and a velocity variation into a sensor output signal that is proportional to a Coriolis force.

16. The phase delay adjustment system according to claim 13, wherein the sensor signal is a differential sinusoidal analog signal proportional to the first signal, the first signal is in phase with a quadrature error signal and out of phase with a Coriolis signal.

17. The phase delay adjustment system according to claim 13, wherein the phase trim module is configured to use external testing equipment to determine an offset value to adjust the calibration signal.

18. The phase delay adjustment system according to claim 13, wherein the carrier signal serves as a reference to generate a control signal that controls the calibration signal.

* * * * *